US012591557B2

(12) United States Patent (10) Patent No.: US 12,591,557 B2
Chen et al. (45) Date of Patent: Mar. 31, 2026

(54) BLOCKCHAIN AUDIT SYSTEM

(71) Applicants: KLICKKLACK INFORMATION SECURITY CO., LTD., Taipei City (TW); Ju-We Chen, Taipei City (TW)

(72) Inventors: Ju-We Chen, Taipei City (TW); Shao-Feng Huang, Taipei City (TW); Yi Lin, Taipei City (TW); Jen-Fu Wang, Taipei City (TW); Ching-Yuan Chen, Taipei City (TW)

(73) Assignees: KLICKKLACK INFORMATION SECURITY CO., LTD., Taipei City (TW); Ju-We Chen, Taipei City (TW)

( * ) Notice: Subject to any disclaimer, the term of this patent is extended or adjusted under 35 U.S.C. 154(b) by 186 days.

(21) Appl. No.: 18/343,213

(22) Filed: Jun. 28, 2023

(65) Prior Publication Data

US 2025/0005006 A1     Jan. 2, 2025

(51) Int. Cl.
   *G06F 16/22*          (2019.01)
   *G06F 16/21*          (2019.01)

(52) U.S. Cl.
   CPC ........ *G06F 16/219* (2019.01); *G06F 16/2255* (2019.01)

(58) Field of Classification Search
   CPC .. G06F 16/219; G06F 16/2255; G06F 16/182; G06F 16/2365; G06F 16/27;
   (Continued)

(56) References Cited

U.S. PATENT DOCUMENTS 12,039,089 B2 * 7/2024 Grover ................. H04L 9/3236
2018/0227118 A1 * 8/2018 Bibera ................. H04L 63/102
(Continued)

FOREIGN PATENT DOCUMENTS

CN     114491662 A     5/2022
CN     114564757 A     5/2022
(Continued)

OTHER PUBLICATIONS

Liao et al. "Blockchain Adoption and Corporate Financial Reporting Quality" University of Electronic Science and Technology of China Sep. 10, 2024 (Year: 2024).*
(Continued)

*Primary Examiner* — Ajay M Bhatia
*Assistant Examiner* — Berhanu Mitiku
(74) *Attorney, Agent, or Firm* — Best & Flanagan LLP

(57)          ABSTRACT
A blockchain audit system includes: an audit control interface, receiving a transaction data which is written into a transaction database; an audit blockchain connected to the audit control interface, to record multiple audit-confirmed transaction records. The audit control interface generates a transaction record according to the received transaction data and adds the transaction record to a database transaction record summary table; if the transaction record is in a database transaction record missing list, the transaction record in the database transaction record missing list is removed, otherwise, if the transaction record is in a blockchain transaction record summary table, the transaction record is added to an audit-confirmed transaction record list, and a transaction block number of the transaction record is written back to the corresponding transaction data in the transaction database.

12 Claims, 8 Drawing Sheets

(58) Field of Classification Search

CPC .. G06F 16/2474; G06F 16/2477; G06F 21/62; G06F 16/23; G06F 16/21; G06F 16/22; H04L 2209/56; H04L 9/3236; H04L 9/32; G06Q 20/3674

See application file for complete search history.

(56) References Cited

U.S. PATENT DOCUMENTS

| | | | | |
|---|---|---|---|---|
| 2021/0272113 A1* | 9/2021 | Yasumitsu | ............. | G06Q 40/12 |
| 2022/0083656 A1* | 3/2022 | Park | ................... | G06F 16/2379 |
| 2023/0267234 A1* | 8/2023 | Grover | ................. | H04L 9/3236 |
| | | | | 713/189 |

FOREIGN PATENT DOCUMENTS

| | | | |
|---|---|---|---|
| CN | 114579581 A | 6/2022 | |
| CN | 115048672 A | 9/2022 | |
| CN | 115114303 A | 9/2022 | |
| WO | WO-2020055413 A1 * | 3/2020 | ........... H04L 9/3239 |

OTHER PUBLICATIONS

Kumar "Blockchain-Al Fusion Revolutionizing Financial Transactions" Amity international business school, Amity university, Noida, India. Jun. 2024 (Year: 2024).*

Guo_et_al. "When Auditing Meets Blochian: A Study on Applying Blockchain Smart Contracts in Auditing" University of North Dakota Forthcoming & Accepted by International Journal of Accounting Information Systems in Aug. 2024 (Year: 2024).*

Oladejo_et_al "Blockchain Technology Disruptions: Exploring Accounting and Auditing and Practitioners' Perception" Accounting & Finance. 2024;00:1-28 Musbaudeen Titilope Oladejo, Department of Accounting, Faculty of Management (Year: 2024).*

* cited by examiner

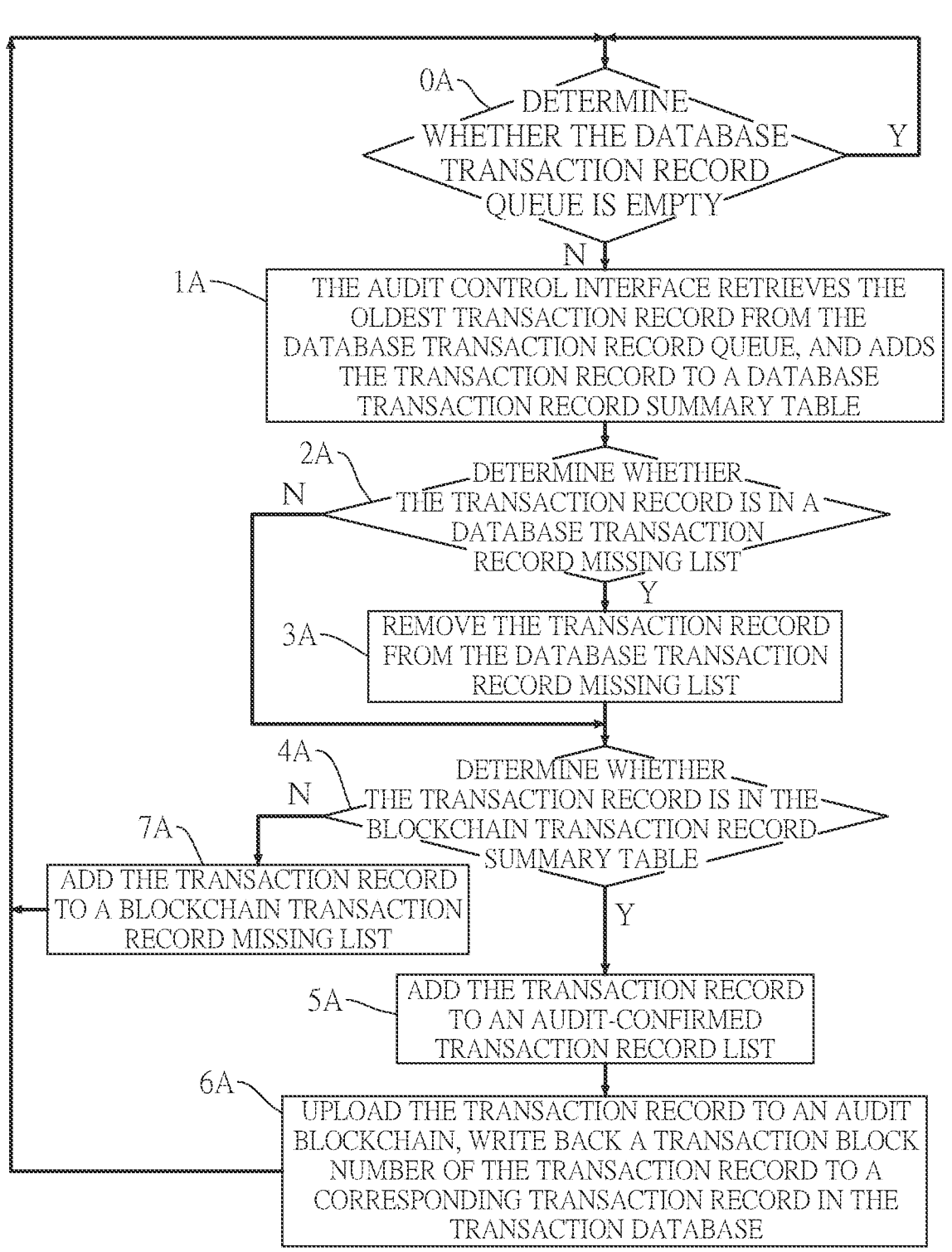

0A — DETERMINE WHETHER THE DATABASE TRANSACTION RECORD QUEUE IS EMPTY

Y

N

1A — THE AUDIT CONTROL INTERFACE RETRIEVES THE OLDEST TRANSACTION RECORD FROM THE DATABASE TRANSACTION RECORD QUEUE, AND ADDS THE TRANSACTION RECORD TO A DATABASE TRANSACTION RECORD SUMMARY TABLE

2A — DETERMINE WHETHER THE TRANSACTION RECORD IS IN A DATABASE TRANSACTION RECORD MISSING LIST

N

Y

3A — REMOVE THE TRANSACTION RECORD FROM THE DATABASE TRANSACTION RECORD MISSING LIST

4A — DETERMINE WHETHER THE TRANSACTION RECORD IS IN THE BLOCKCHAIN TRANSACTION RECORD SUMMARY TABLE

N

Y

7A — ADD THE TRANSACTION RECORD TO A BLOCKCHAIN TRANSACTION RECORD MISSING LIST

5A — ADD THE TRANSACTION RECORD TO AN AUDIT-CONFIRMED TRANSACTION RECORD LIST

6A — UPLOAD THE TRANSACTION RECORD TO AN AUDIT BLOCKCHAIN, WRITE BACK A TRANSACTION BLOCK NUMBER OF THE TRANSACTION RECORD TO A CORRESPONDING TRANSACTION RECORD IN THE TRANSACTION DATABASE

FIG.2B

10B — DETERMINE WHETHER A TRANSACTION DATA IS SUCCESSFULLY UPLOADED TO THE TRANSACTION BLOCKCHAIN

N

Y

11B — GENERATE A TRANSACTION RECORD ACCORDING TO THE TRANSACTION DATA AND PUSH THE TRANSACTION RECORD TO THE BLOCKCHAIN TRANSACTION RECORD QUEUE

BLOCKCHAIN AUDIT SYSTEM

BACKGROUND OF THE INVENTION

1. Field of the Invention

The present invention relates to a system for auditing, especially to a blockchain audit system, which is used to audit operations of a blockchain.

2. Description of the Related Art

Blockchain distributed ledger technology has been successfully used for many years since 2009, which proves that blockchain technology is feasible. In the application of general blockchain technology, due to the limitations of distributed ledger technology, efficient query cannot be carried out. Therefore, in practice, traditionally used specific databases such as relational databases are used to assist distributed ledger technology to improve effectiveness. As the database and the distributed ledger of the blockchain coexist at the same time, not only the original process of the application is not restricted by the blockchain, but also the distributed ledger of the blockchain can be used to ensure contents of the databases are not tampered with.

Please refer to FIG. 5. FIG. 5 is a schematic diagram of a blockchain 20 for explaining basic structures and operations of a general blockchain. Wherein the blockchain 20 has multiple nodes such as nodes A, B and C, and each of the multiple nodes stores a ledger such as: node A stores a ledger a, node B stores a ledger b and node C stores a ledger c. The physical devices that constitute the node can be a server, a computer equipment or a mobile phone that can be connected to the Internet, and the entity that constitutes the ledger book can be an electronic file which is stored in a memory device such as a semiconductor memory device e.g. dynamic memory (DRAM), static memory (SRAM), flash memory (Flash memory), solid-state disk (SSD), or magnetic memory e.g. a hard disk drive, or compact disk (CD), etc.

However, in order to ensure the reliability of data in a blockchain, certain amount of time is needed for data to be written into a block of the blockchain and for generating a new block, in addition, as all nodes in the blockchain must synchronize with the data written so as to achieve a consensus, more time is needed; as limited by the aforesaid technical limitations of a blockchain, the query efficiency of records in the blockchain is not high, and therefore systems of the blockchain application usually adopt a combination of the blockchain technology and the database technology. Obviously, there are differences in terms of speed and writing methods between the blockchain and the database. These differences, coupled with inherent problems that the blockchain and the database might have, may render data unsuccessfully written to the blockchain or to the database.

For example, under the application architecture shown in FIG. 6, considering the situation where data is uploaded to the blockchain first and then recorded to the database (hereinafter referred to as scenario 1), firstly, transaction data 30 is uploaded to a blockchain 31 through an application interface 34 (hereinafter referred to as "data uploaded to the blockchain"), if the data uploaded to the blockchain fails, the transaction procedure needs to be restarted. If the data uploaded to the blockchain is successful, then the transaction data 30 is recorded to a database 32 through another application interface 33 (hereinafter referred to as "data recorded to the database"), and at this time, if the data recorded to the database fails, then only the blockchain 31 has the correct record; as a result, the records of the database 32 and the blockchain 31 are inconsistent.

Next, consider the situation where data is recorded to the database first and then uploaded to the blockchain (hereinafter referred to as scenario 2). Firstly, record a transaction data 30 to the database 32 through an application interface 33. If the data recorded to the database fails, the transaction procedure needs to be restarted. If successful, then the transaction data 30 is uploaded to the blockchain 31 via the application interface 34. At this time, if the data fails to be uploaded to the blockchain, only the database 32 has the correct record; as a result, the records of the database 32 and the blockchain 31 are inconsistent.

Next, consider the situation where data is recorded to the database and the blockchain simultaneously (hereinafter referred to as scenario 3). The transaction data 30 is recorded to the database 32 through the application interface 33. If the data recorded to the database fails, this has nothing to do with the blockchain 31. At the same time, the transaction data 30 is uploaded to the blockchain 31 through the application interface 34. If the data uploaded to the blockchain fails, this has nothing to do with the database 32. Hence, the records of the database 32 and the blockchain 31 are inconsistent.

Based on the aforementioned, data inconsistencies may occur in all of the above three scenarios of collaborated usages of the database and the blockchain. In practice, it was discovered that in scenario 1 where data is uploaded to the blockchain first and then recorded to the database, a transaction data correction operation will generate three blockchain records, which increase the audit load. In scenario 2 where data is recorded to the database first and then uploaded to the blockchain, re-uploading data to the blockchain takes transaction time, and data consistency can only be reached after the ledger block is updated. In scenario 3 where data is recorded to the database and the blockchain simultaneously, transaction confirmation time is prolonged, transaction failure rate increases, multiple blockchain updated records are generated for re-uploading data to the blockchain, and the database records do not have the transaction block numbers. Based on the analysis of the above three scenarios, it can be seen that after the collaboration of the blockchain and the database, there may still be inconsistencies between the records of the database and the distributed ledger of the blockchain.

With vigorous development in blockchains, how to effectively avoid the situations where inconsistent records between the above-mentioned database and the blockchain distributed ledger occur, is presently an urgent problem to be solved.

SUMMARY OF THE INVENTION

In order to solve the above problems, the present invention discloses a blockchain audit system which is used upon a transaction database and a transaction blockchain for auditing and confirming data consistency between the transaction database and the transaction blockchain, wherein the transaction database is used to record multiple transaction data, and the transaction blockchain is used to record said multiple transaction data which are not modifiable.

In one embodiment, the blockchain audit system includes:
an audit control interface, which receives multiple transaction data written into a transaction database, and receives multiple transaction data uploaded to a transaction blockchain;

an audit blockchain, connected to the audit control interface, the audit blockchain used to record multiple transaction records that are audit-confirmed;

wherein the audit control interface compares the two of the received multiple transaction record written into the transaction database and the received multiple transaction record uploaded to the transaction blockchain, and matching transaction records between the two are recorded by the audit control interface as audit-confirmed transaction records; and when the audit control interface receives a transaction block number of a newly added transaction block from the transaction blockchain, the audit control interface creates a new audit block in the audit blockchain to record the audit-confirmed transaction records; and the audit control interface recording mismatching transaction records between the transaction database and the transaction blockchain to reflect mismatches between the two.

In one embodiment, the blockchain audit system includes:

an audit control interface, which receives transaction data written into a transaction database;

an audit blockchain connected to the audit control interface, the audit blockchain used to record multiple transaction records that are audit-confirmed, and the audit control interface also performing the following steps:

Step 1A: generating a transaction record based on the received transaction data and adding the transaction record to a database transaction record summary table;

Step 2A: when the transaction record is not in a database transaction record missing list, going to step 4A;

Step 3A: removing the transaction record from the database transaction record missing list;

Step 4A: when the transaction record is not in a blockchain transaction record summary table, going to step 7A;

Step 5A: adding the transaction record to an audit-confirmed transaction record list;

Step 6A: uploading the transaction record to the audit blockchain, and going to step 1A;

Step 7A: adding the transaction record to a blockchain transaction record missing list, and going to step 1A;

wherein, the database transaction record summary table records transaction records of the transaction database, the blockchain transaction record summary table records transaction records of a transaction blockchain, and the database transaction record missing list records transaction records that exist in the blockchain transaction record summary table but do not exist in the database transaction record summary table, the blockchain transaction record missing list records transaction records that exist in the database transaction record summary table but do not exist in the blockchain transaction record summary table, the audit-confirmed transaction record list records transaction records that exist in both the database transaction record summary table and the blockchain transaction record summary table;

wherein, each transaction record in the database transaction record summary table has a transaction serial number, each transaction record in the blockchain transaction record summary table has a transaction serial number and a transaction block number, and each transaction record in the audit-confirmed transaction record list has a transaction serial number and a transaction block number, each transaction record in the database transaction record missing list has a transaction serial number, and each transaction record in the blockchain transaction record missing list has a transaction serial number.

In one embodiment, the blockchain audit system includes:

an audit control interface, which receives transaction data uploaded to a transaction blockchain;

an audit blockchain connected to the audit control interface, wherein the audit blockchain is used to record multiple transaction records that are audit-confirmed, and the audit control interface also performs the following steps:

Step 1B: generating a transaction record based on the received transaction data and adding the transaction record to a blockchain transaction record summary table;

Step 2B: when the transaction record is not in a blockchain transaction record missing list, going to step 4B;

Step 3B: removing the transaction record from the blockchain transaction record missing list;

Step 4B: when the transaction record is not in a database transaction record summary table, going to step 7B;

Step 5B: adding the transaction record to an audit-confirmed transaction record list;

Step 6B: uploading the transaction record to the audit blockchain, and going to step 1B;

Step 7B: adding the transaction record to a database transaction record missing list, and going to step 1B.

Preferably, when the audit control interface receives a transaction block number of a newly added transaction block from the transaction blockchain, the audit control interface generates a new audit block in the audit blockchain, and the new audit block includes all transaction records in the audit-confirmed transaction record list having the same transaction block number as the newly added transaction block.

Preferably, when the transaction record is uploaded to the audit blockchain, the audit control interface further writes back a transaction block number of the transaction record to a corresponding transaction record in the transaction database.

BRIEF DESCRIPTION OF THE DRAWINGS

FIGS. 2A and 2B are schematic flowcharts of the first embodiment of the blockchain audit system of the present invention;

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
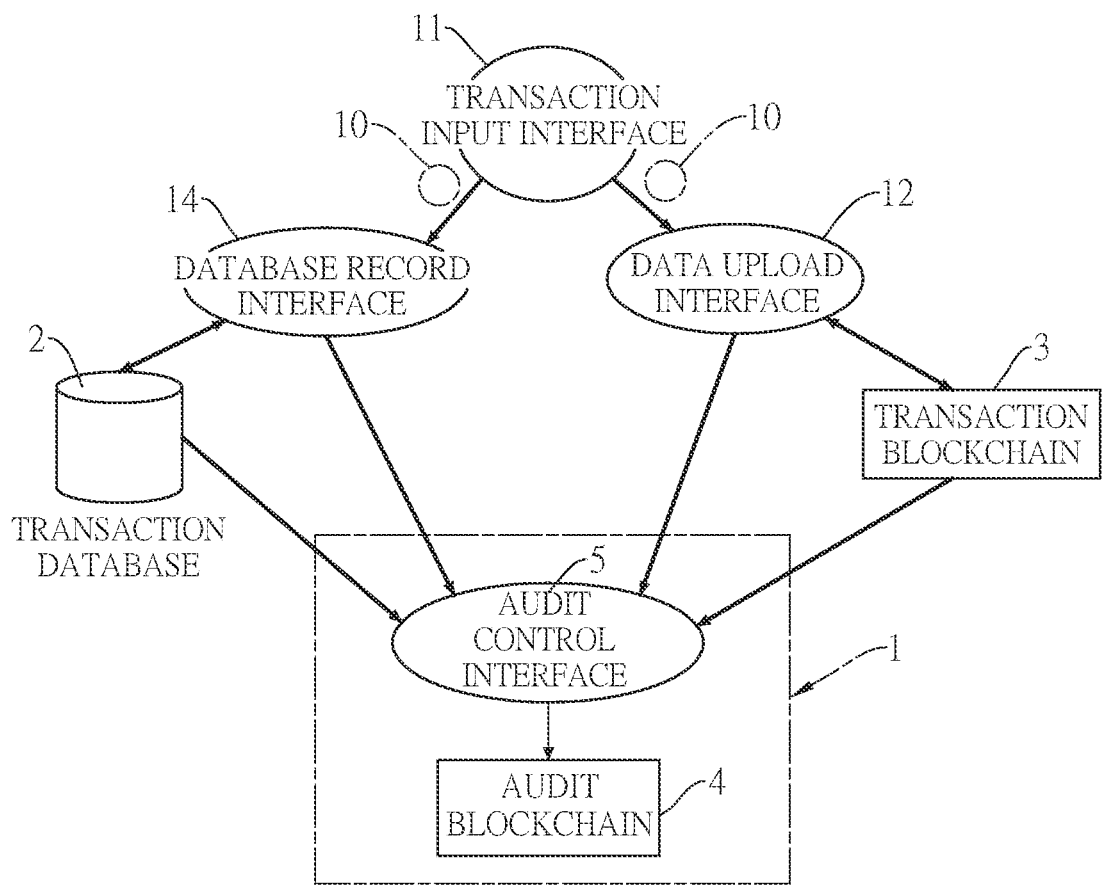
FIG. 1 is a schematic diagram of the blockchain audit system of the present invention.

Please refer to FIG. 1, which is a schematic diagram of the architecture of the blockchain audit system 1 of the present invention. The blockchain audit system 1 of the present invention includes a transaction database 2 capable of storing multiple transaction data, a transaction blockchain 3 capable of storing multiple transaction data, an audit blockchain 4, an audit control interface 5, a transaction input interface 11, a data upload interface 12 and a database record interface 14. The transaction input interface 11 denotes a computer device or an application program executed on the computer device. The entity of the transaction database 2 can be a computer device capable of running a database software and a physical or virtual storage device capable of storing data and information. The transaction blockchain 3 can be a plurality of physical or virtual computer devices with networking capabilities (hereinafter referred to as multiple transaction nodes) and multiple storage devices corresponding to the multiple transaction nodes, all of which have the abilities to store ledger files.

The audit blockchain 4 can be a plurality of physical or virtual computer devices with networking capabilities (hereinafter referred to as multiple audit nodes) and multiple storage devices corresponding to the multiple audit nodes, all of which have the abilities to store ledger files. The entity of the audit control interface 5 can be an application program, which is executed by a computer device connected to the Internet, so as to obtain information of one or more transaction data from the transaction database 2, and to obtain information of one or more transaction data from the transaction blockchain 3. The entity of the data upload interface 12 can be an application program, which is executed on an external computer device connected to the Internet, so as to upload a transaction data 10 to the transaction blockchain 3, and obtain information of one or more transaction data from the transaction blockchain 3; similarly, the entity of the database record interface 14 can be an application program executed on the external computer device capable of connecting to the Internet, so as to write the transaction data 10 into the transaction database 2.

Continuing from the above, a transaction data 10 is uploaded to the transaction blockchain 3 through the data upload interface 12, and the transaction data 10 is also written into the transaction database 2 through the database record interface 14. When the transaction data 10 is successfully uploaded to the transaction blockchain 3, the transaction blockchain 3 will provide a transaction record of the transaction data 10 to the audit control interface 5 for auditing purposes. The transaction record has a unique transaction serial number and a transaction block number of the transaction block to which the transaction record belongs; similarly, when the transaction data 10 is successfully written to the transaction database 2, the transaction database 2 also provides the transaction record of the transaction data 10 to the audit control interface 5 for auditing purposes, and, at this moment, the transaction record has the transaction serial number.

Figure 2A:
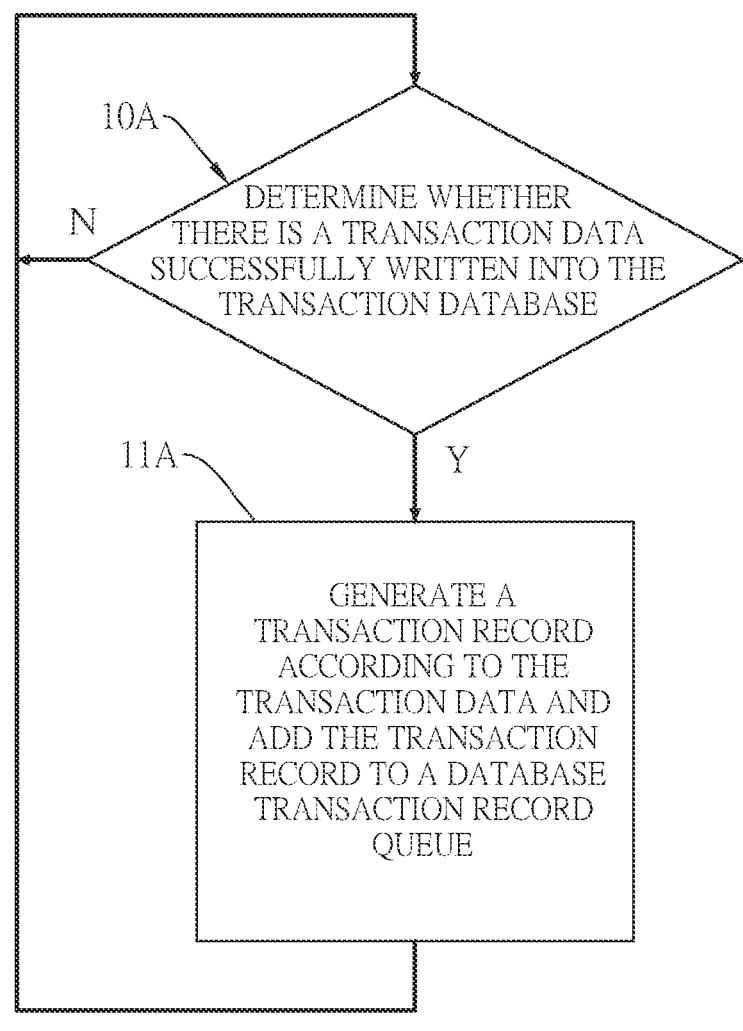

Please refer to FIGS. 2A, 2B. FIGS. 2A, 2B are for the first embodiment of the blockchain audit system of the present invention. As shown in FIG. 2A, the audit control interface 5 has a database transaction record queue, and the database transaction record queue is a first-in-first-out (FIFO) queue which receives and stores a transaction data provided by the transaction database 2 according to the following steps:

Step 10A: The audit control interface 5 determines whether there is a transaction data 10 successfully written into the transaction database 2, and when no transaction data 10 is successfully written into the transaction database 2, return to step 10A, and when there is a transaction data 10 successfully written into the transaction database 2, go to step 11A;

Step 11A: Generate a transaction record according to the transaction data and add the transaction record to a database transaction record queue, and return to step 10A.

As shown in FIG. 2B, the audit control interface 5 processes and audits the transaction records provided by the database transaction record queue in the following steps:

Step 0A: The audit control interface 5 determines whether the database transaction record queue is empty, and when the database transaction record queue is empty, return to step 0A;

Step 1A: The audit control interface 5 retrieves the oldest transaction record from the database transaction record queue, and adds the transaction record to a database transaction record summary table;

Step 2A: Determine whether the transaction record is in a database transaction record missing list, and if the transaction record is not in the database transaction record missing list, go to step 4A;

Step 3A: Remove the transaction record from the database transaction record missing list;

Step 4A: Determine whether the transaction record is in the blockchain transaction record summary table, and when the transaction record is not in the blockchain transaction record summary table, go to step 7A;

Step 5A: Add the transaction record to an audit-confirmed transaction record list;

Step 6A: Upload the transaction record to an audit blockchain 5, write back a transaction block number of the transaction record to a corresponding transaction record in the transaction database 2, and go to step 0A;

Step 7A: Add the transaction record to a blockchain transaction record missing list, and go to step 0A.

Wherein, the database transaction record summary table records all relevant transaction records of the transaction database 2, the blockchain transaction record summary table records all relevant transaction records of the transaction blockchain 3, and the database transaction record missing list records transaction records that exist in the blockchain transaction record summary table but do not exist in the database transaction record summary table. The blockchain transaction record missing list records transaction records that exist in the database transaction record summary table but do not exist in the blockchain transaction record summary table, the audit-confirmed transaction record list records all transaction records that exist in both the database transaction record summary table and the blockchain transaction record summary table.

And, wherein each transaction record in the database transaction record summary table has a transaction serial number, each transaction record in the blockchain transaction record summary table has a transaction serial number and a transaction block number, each transaction record in the audit-confirmed transaction record list has a transaction serial number and a transaction block number, each transaction record in the database transaction record missing list has a transaction serial number, and each transaction record in the blockchain transaction record missing list has a transaction serial number.

Figure 3A:
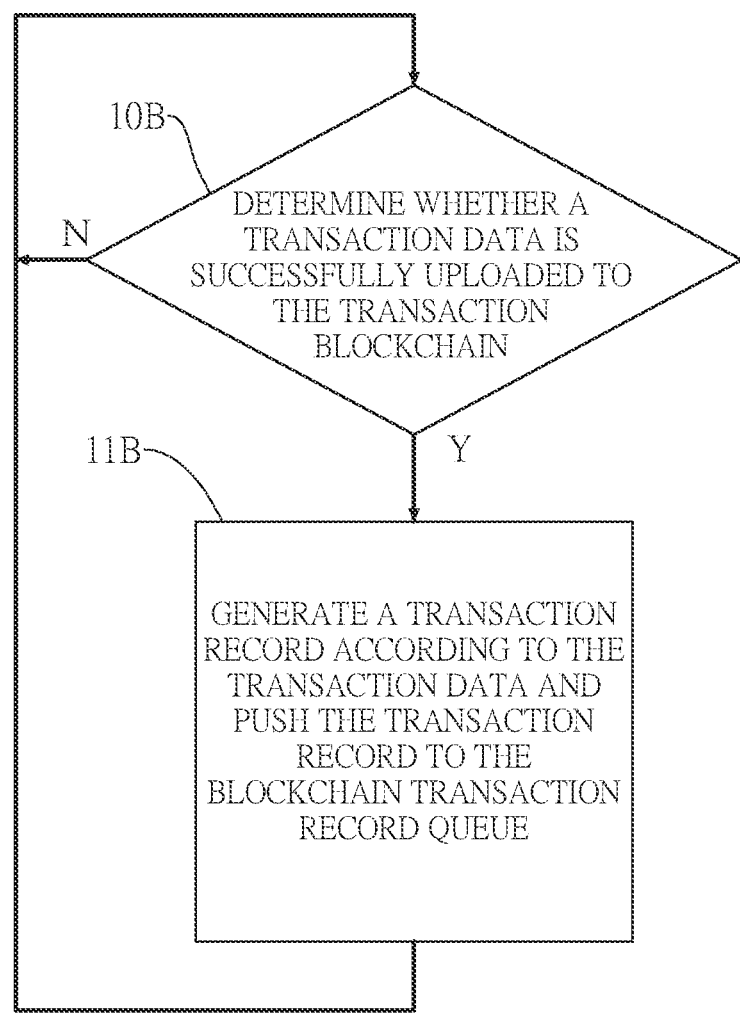
FIGS. 3A and 3B are schematic flowcharts of the second embodiment of the blockchain audit system of the present invention.
Figure 3B:
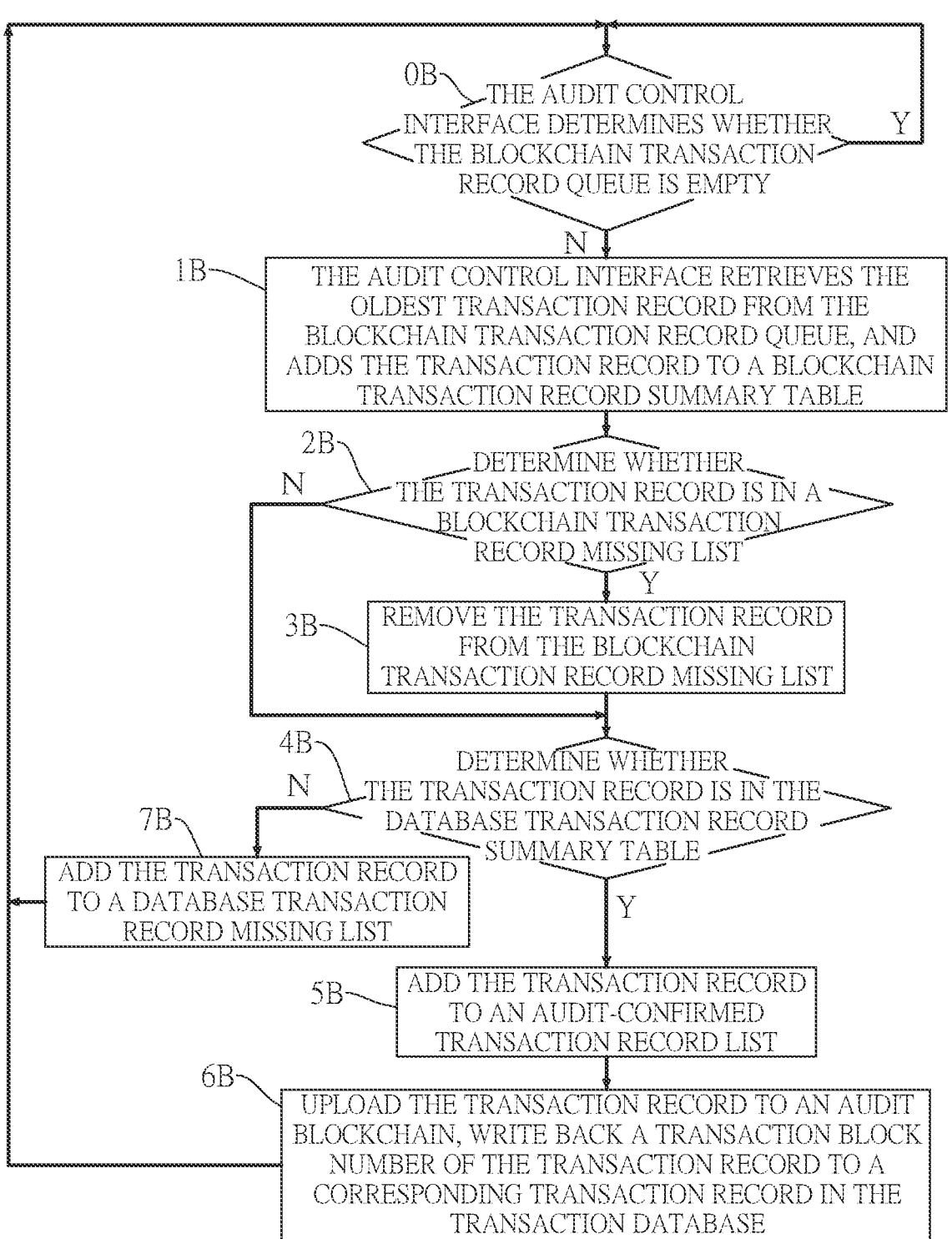

Please refer to FIGS. 3A, 3B. FIGS. 3A, 3B are the second embodiment of the blockchain audit system of the present invention. As shown in FIG. 3A, the audit control interface 5 also has a blockchain transaction record queue, the blockchain transaction record queue is a first-in-first-out queue, and the steps to receive and record a transaction record provided by the transaction blockchain 3 are as follows:

Step 10B: The audit control interface 5 determines whether a transaction data 10 is successfully uploaded to the transaction blockchain 3, and when no transaction data 10 is successfully uploaded to the transaction blockchain 3, return to step 10B;

Step 11B: Generate a transaction record according to the transaction data 10 and push the transaction record to the blockchain transaction record queue, and return to step 10B.

As shown in FIG. 3B, the audit control interface 5 processes and audits the transaction records provided by the blockchain transaction record queue in the following steps:

Step 0B: The audit control interface 5 determines whether the blockchain transaction record queue is empty, and when the blockchain transaction record queue is empty, return to step 0B;

Step 1B: The audit control interface 5 retrieves the oldest transaction record from the blockchain transaction record queue, and adds the transaction record to a blockchain transaction record summary table;

step 2B: Determine whether the transaction record is in a blockchain transaction record missing list, and when the transaction record is not in the blockchain transaction record missing list, go to step 4B;

Step 3B: Remove the transaction record from the blockchain transaction record missing list;

Step 4B: Determine whether the transaction record is in the database transaction record summary table, and when the transaction record is not in the database transaction record summary table, go to step 7B;

Step 5B: Add the transaction record to an audit-confirmed transaction record list;

Step 6B: Upload the transaction record to an audit blockchain 3, write back a transaction block number of the transaction record to a corresponding transaction record in the transaction database 2, and go to step 0B;

Step 7B: Add the transaction record to a database transaction record missing list, and go to step 0B.

Figure 4:
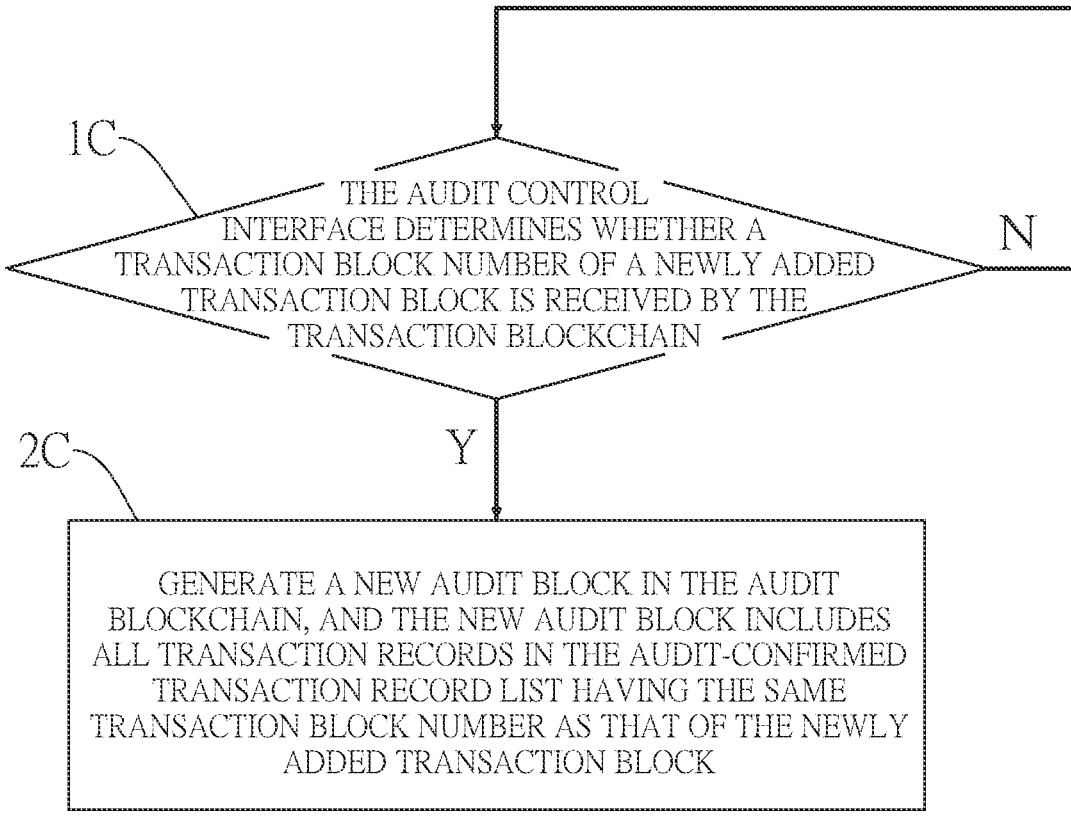
FIG. 4 is a schematic flow chart of the third embodiment of the blockchain audit system of the present invention.
Figure 5:
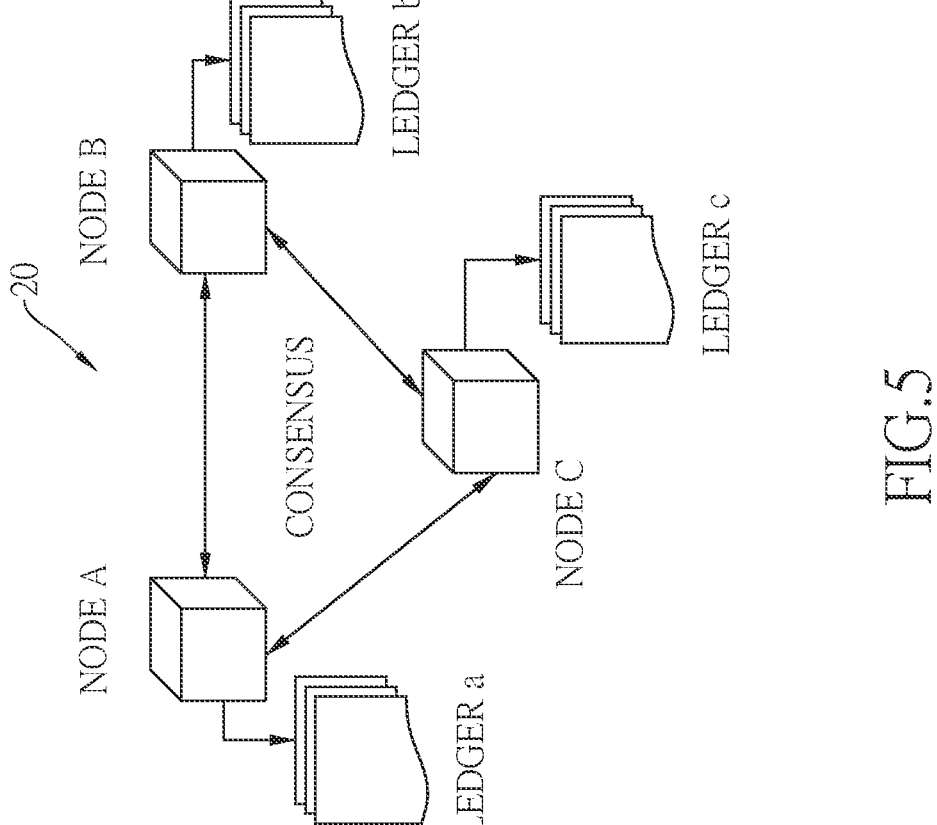
FIG. 5 is a schematic diagram of an architecture of a conventional blockchain.
Figure 6:
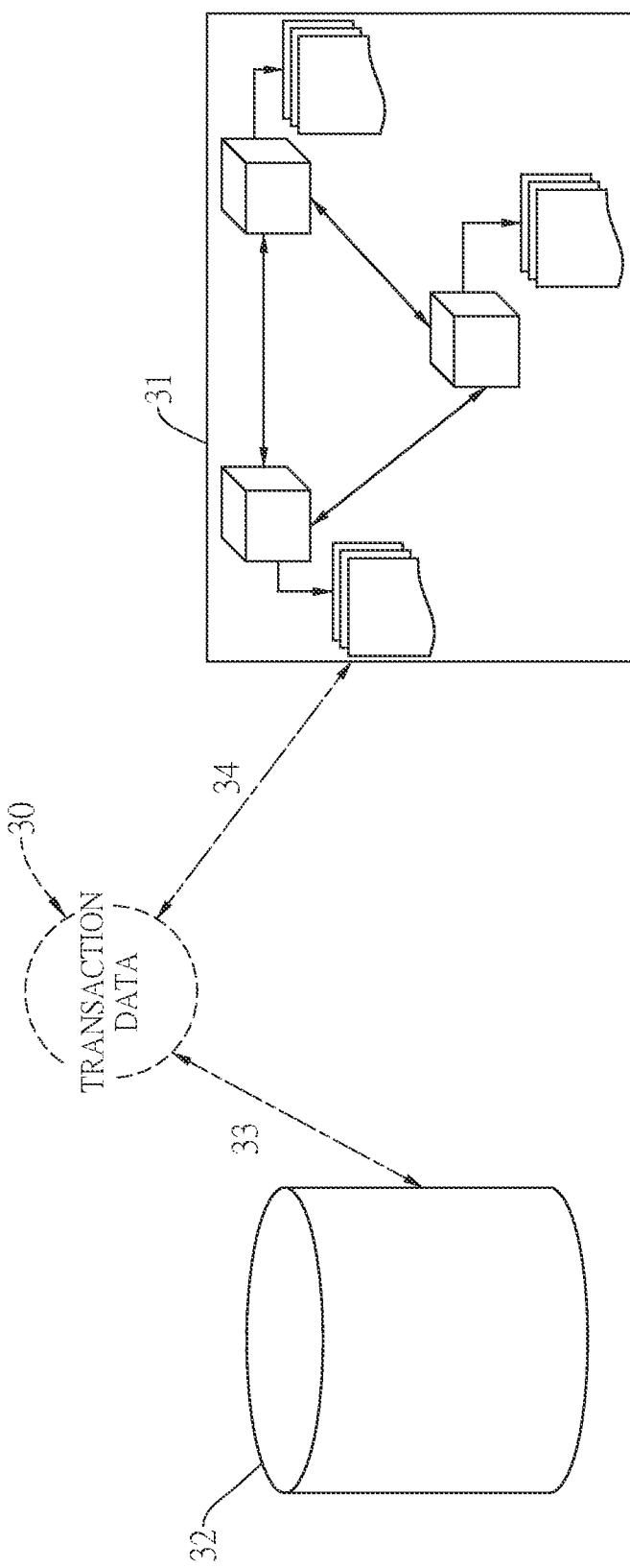
FIG. 6 is a schematic diagram of an architecture of a conventional blockchain application.

Please refer to FIG. 4, which is the third embodiment of the blockchain audit system of the present invention. When the audit control interface 5 receives a transaction block number of a newly added transaction block from the transaction blockchain 3, the audit control interface 5 will also generate a new audit block in the audit blockchain 4, and the new audit block includes all transaction records in the audit-confirmed transaction record list having the same transaction block number as the newly added transaction block. Please refer to the following steps:

Step 1C: The audit control interface 5 determines whether a transaction block number of a newly added transaction block is received by the transaction blockchain 3, and when the audit control interface 5 does not receive a transaction block number of a newly added transaction block from the transaction blockchain 3, return to step 1C;

Step 2C: Generate a new audit block in the audit blockchain 4, and the new audit block includes all transaction records in the audit-confirmed transaction record list having the same transaction block number as the newly added transaction block, go to step 1C.

From the aforementioned, it can be known that the audit blockchain 4 is used to audit and record audit-confirmed transaction records, and in addition, when the transaction blockchain 3 generates a new transaction block, a corresponding audit block is also generated in the audit blockchain 4. At the same time, a database transaction record missing list and a blockchain transaction record missing list are used to record the transaction records that have not yet been audit confirmed; as a result, the present invention can use the audit blockchain to confirm whether a transaction data is both successfully recorded in the database 2 and successfully uploaded to the transaction blockchain 3.

The aforementioned are preferred embodiments of the present invention. It should be noted that for those of ordinary skill in the art, without departing from the principles of the present invention, certain improvements and retouches of the present invention can still be made, which are nevertheless considered as within the protection scope of the present invention.

What is claimed is:

1. A blockchain audit system, including:
an audit control interface, which receives multiple transaction data written into a transaction database, and receives multiple transaction data uploaded to a transaction blockchain;
wherein the audit control interface compares two of the received multiple transaction data written into the transaction database and the received multiple transaction data uploaded to the transaction blockchain, and matched transaction data between the two are recorded by the audit control interface as audit-confirmed transaction records;
an audit blockchain, connected to the audit control interface;
when the audit control interface receives a transaction block number of a newly added transaction block from the transaction blockchain, the audit control interface creates a new audit block in the audit blockchain to record the audit-confirmed transaction records; wherein the transaction blockchain and the audit blockchain respectively comprise a plurality of nodes each of which is a physical computer device with networking capabilities and with a corresponding storage device.

2. The blockchain audit system as claimed in claim 1 further including the following step: the audit control interface recording mismatching transaction data between the transaction database and the transaction blockchain to reflect mismatches between the transaction data of the transaction database and the transaction blockchain.

3. The blockchain audit system as claimed in claim 1, wherein the audit control interface is an application program and is executed on a computer device capable of connecting to the Internet.

4. The blockchain audit system as claimed in claim 1, wherein the audit blockchain includes at least one node, and each of the at least one node has at least one audit-confirmed blockchain block.

5. The blockchain audit system as claimed in claim 1, wherein, when the audit control interface receives transaction data written into the transaction database;
the audit control interface performs the following steps:
step 1A: generating a transaction record based on the received transaction data, and adding the transaction record to a database transaction record summary table;
step 2A: when the transaction record is not in a database transaction record missing list, going to step 4A;

step 3A: when the transaction record is in the database transaction record missing list, removing the transaction record from the database transaction record missing list;

step 4A: when the transaction record is not in a blockchain transaction record summary table, going to step 7A;

step 5A: when the transaction record is in the blockchain transaction record summary table, adding the transaction record to an audit-confirmed transaction record list;

step 6A: uploading the transaction record to the audit blockchain, and going to step 1A;

step 7A: adding the transaction record to a blockchain transaction record missing list, and going to step 1A;

wherein, the database transaction record summary table records transaction records of the transaction database, the blockchain transaction record summary table records transaction records of a transaction blockchain, and the database transaction record missing list records transaction records that exist in the blockchain transaction record summary table but do not exist in the database transaction record summary table, the blockchain transaction record missing list records transaction records that exist in the database transaction record summary table but do not exist in the blockchain transaction record summary table, the audit-confirmed transaction record list records transaction records that exist in both the database transaction record summary table and the blockchain transaction record summary table;

wherein, each transaction record in the database transaction record summary table has a transaction serial number, each transaction record in the blockchain transaction record summary table has a transaction serial number and a transaction block number, and each transaction record in the audit-confirmed transaction record list has a transaction serial number and a transaction block number, each transaction record in the database transaction record missing list has a transaction serial number, and each transaction record in the blockchain transaction record missing list has a transaction serial number.

6. The blockchain audit system as claimed in claim 5 further including the following steps:

when the audit control interface receives a transaction block number of a newly added transaction block from the transaction blockchain, the audit control interface generates a new audit block in the audit blockchain, and the new audit block includes all transaction records in the audit-confirmed transaction record list having the same transaction block number as the newly added transaction block.

7. The blockchain audit system as claimed in claim 5 further including the following steps:

when the transaction record is uploaded to the audit blockchain, the audit control interface further writing back a transaction block number of the transaction record to a corresponding transaction record in the transaction database.

8. The blockchain audit system as claimed in claim 1, wherein, when the audit control interface receives transaction data uploaded to the transaction blockchain;

the audit control interface performs the following steps:

step 1B: generating a transaction record based on the received transaction data and adding the transaction record to a blockchain transaction record summary table;

step 2B: when the transaction record is not in a blockchain transaction record missing list, going to step 4B;

step 3B: when the transaction record is in the blockchain transaction record missing list, removing the transaction record from the blockchain transaction record missing list;

step 4B: when the transaction record is not in a database transaction record summary table, going to step 7B;

step 5B: when the transaction record is in the database transaction record summary table, adding the transaction record to an audit-confirmed transaction record list;

step 6B: uploading the transaction record to the audit blockchain, and going to step 1B;

step 7B: adding the transaction record to a database transaction record missing list, and going to step 1B;

wherein, the database transaction record summary table records transaction records of the transaction database, the blockchain transaction record summary table records transaction records of a transaction blockchain, and the database transaction record missing list records transaction records that exist in the blockchain transaction record summary table but do not exist in the database transaction record summary table, the blockchain transaction record missing list records transaction records that exist in the database transaction record summary table but do not exist in the blockchain transaction record summary table, the audit-confirmed transaction record list records transaction records that exist in both the database transaction record summary table and the blockchain transaction record summary table;

wherein, each transaction record in the database transaction record summary table has a transaction serial number, each transaction record in the blockchain transaction record summary table has a transaction serial number and a transaction block number, and each transaction record in the audit-confirmed transaction record list has a transaction serial number and a transaction block number, each transaction record in the database transaction record missing list has a transaction serial number, and each transaction record in the blockchain transaction record missing list has a transaction serial number.

9. The blockchain audit system as claimed in claim 8 further including the following steps:

when the audit control interface receives a transaction block number of a newly added transaction block from the transaction blockchain, the audit control interface generates a new audit block in the audit blockchain, and the new audit block includes all transaction records in the audit-confirmed transaction record list having the same transaction block number as the newly added transaction block.

10. The blockchain audit system as claimed in claim 8 further including the following steps:

when the transaction record is uploaded to the audit blockchain, the audit control interface further writes back a transaction block number of the transaction record to a corresponding transaction record in the transaction database.

11. The blockchain audit system as claimed in claim 8, wherein the audit control interface is an application program and is executed on a computer device capable of connecting to the Internet.

12. The blockchain audit system as claimed in claim 8, wherein the audit blockchain includes at least one node, and each of the at least one node has at least one audit-confirmed blockchain block.

\* \* \* \* \*